A. T. GARDNER.
DEVICE FOR SECURING HATS, CAPS, OR BONNETS TO THE HEAD.
APPLICATION FILED DEC. 8, 1911.
1,047,780.
Patented Dec. 17, 1912.
2 SHEETS—SHEET 1.
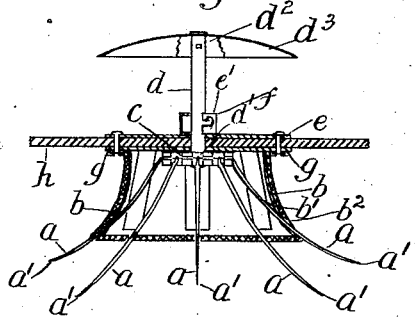
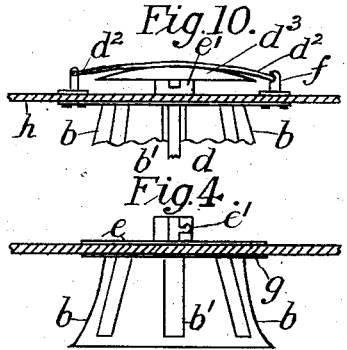
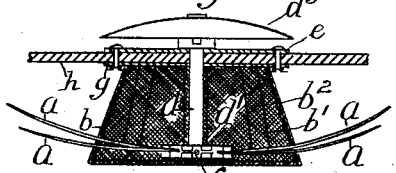
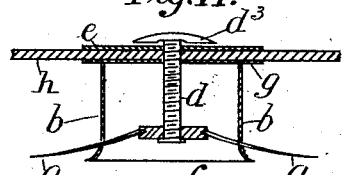
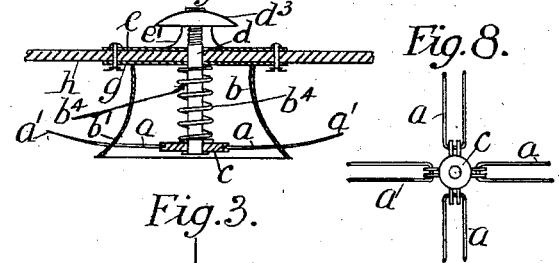
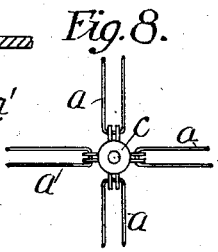
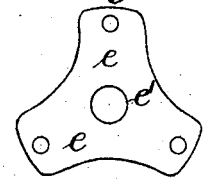
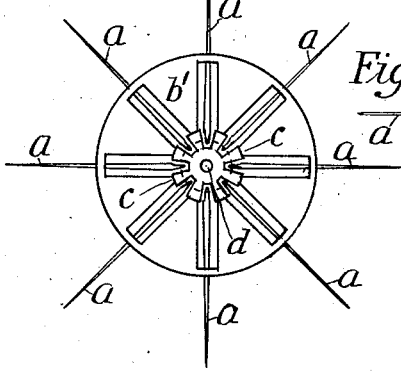
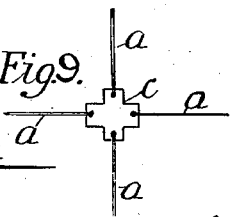
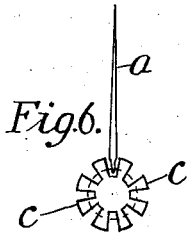
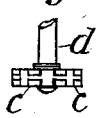
Witnesses.
Inventor.
Arthur T. Gardner
by

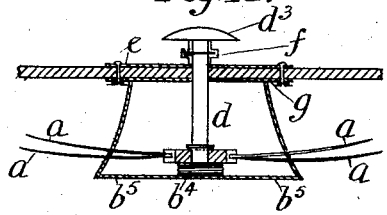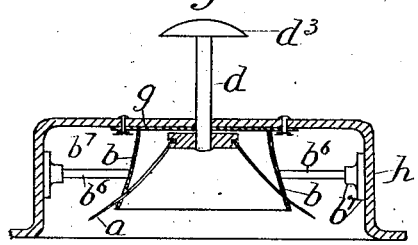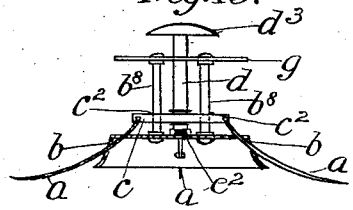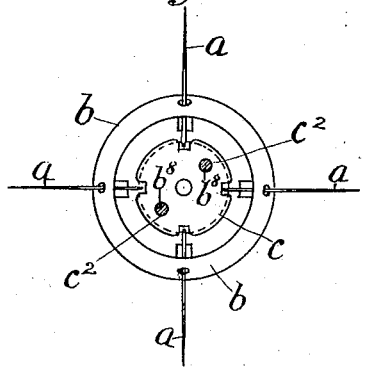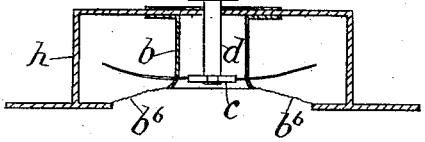

UNITED STATES PATENT OFFICE.

ARTHUR THOMAS GARDNER, OF SIX BELLS, ENGLAND.

DEVICE FOR SECURING HATS, CAPS, OR BONNETS TO THE HEAD.

1,047,780.      Specification of Letters Patent.      Patented Dec. 17, 1912.

Application filed December 8, 1911. Serial No. 664,617.

*To all whom it may concern:*

Be it known that I, ARTHUR THOMAS GARDNER, turner, a subject of the King of Great Britain, residing at Alexandra Road, Six Bells, in the county of Monmouth, England, have invented an Improved Device for Securing Hats, Caps, or Bonnets to the Head, of which the following is a specification.

This invention relates to a device for securing hats, caps, bonnets, and the like coverings on to the head of the wearer, and has for its object to provide an attaching device in connection with such head-covering that will by a simple action enter and connect such head-cover with the hair of the wearer, and by a reverse action release such head-covering.

The device according to this invention comprises a series of prongs, pins, or wires, adapted to be fitted as hereafter described, inside the crown of a lady's hat, head-covering or the like, so that they can be caused by the vertical, or rotary movement of a rod or the like, actuated externally to the said crown, to enter and catch the hair of the wearer, and so secure the hat or like covering to the head of the wearer, and by a reverse movement of such rod can be released, means being provided for locking the device when in use, to prevent it from being inadvertently released.

In the carrying out of this invention there is provided a bell-mouth tube or the like, of any suitable material, and adapted to be placed inside the crown of the hat or like head-covering, and attached by a plate, plates, or the like, to the material of which the head-covering is composed. The bell-mouth tube or the like, is provided with side holes or slots forming guides through which the prongs are extended, the inner ends of the prongs being hinged to a disk placed inside the bell-mouth and attached to and worked, as hereinafter described, by a plunger or rotated rod or the like, operated from the outside of the crown of the hat or the like.

Having thus generally described the object, nature and effect of the invention, I will now proceed to describe it with reference to the accompanying drawings which illustrate certain arrangements and construction of parts according to this invention, applied to a hat.

In the various figures the same or corresponding parts are designated by the same letters of reference and they correspond with those used in the following explanation of the device.

*Description of the drawings.*—Figure 1 shows the device in part sectional elevation arranged for vertical action with the prongs withdrawn, Fig. 2 shows the same with the prongs extended, and Fig. 3 shows the same in plan view seen from the underside. Fig. 4 shows in outside elevation the bell-mouth guide, Fig. 5 the securing plate in plan view, Fig. 6 the disk in plan, and Fig. 7 the disk in elevation. Figs. 8 and 9 show modified forms of the disk, and Fig. 10 shows a modified form of the catch. Fig. 11 shows in side elevation a screw arrangement for operating the prongs, Fig. 12 shows a spring arrangement of bell-mouth guide, and Fig. 13 a modified arrangement of same. Fig. 14 shows a modification of the attachment of the device to the hat. Fig. 15 shows a modification of the bell-mouth and guide, and Fig. 16 shows in plan a modification of the disk to be used with same. Fig. 17 shows in sectional elevation a hat connected to the bell-mouth by wire stays.

With reference to the drawings, $a$ designates the prongs, pins, or wires, by means of which the device attaches the hat or other head-covering to the head by engaging with the hair of the wearer, $b$ denotes the slotted or holed bell-mouth guide which directs the movement of the prongs $a$ when forced down or out, $c$ denotes the disk to which the inner ends of the prongs $a$ are hinged, $d$ denotes the rod, tube, or the like, by which the disk $c$ and prongs $a$ are operated, $e$ denotes the plate or the like by which the device is attached to the hat, $f$ denotes the catch for locking the device when the prongs $a$ are extended to secure the hat on the head of the wearer.

With reference more particularly to Figs. 1, 2, 3, 4, 5, 6 and 7, it will be seen that the bell-mouth $b$ is attached inside the crown of the hat by split-pins, rivets, or the like, to the shell $h$ of the hat by means of the plate $e$ and the plate or flange $g$ of the bell-mouth $b$, and that the rod or tube $d$ passes through the boss $e^1$ of the plate $e$ and carries the notched disk $c$ to which the prongs $a$ are hinged and from which they radiate, the ends $a^1$ of the prongs $a$ passing through the slots $b^1$ in the bell-mouth $b$ which is covered and padded with suitable textile material $b^2$ to guide the prongs $a$ and serve as a pad to enable the bell-mouth $b$ to rest comfortably on the head of the wearer. The lower end $d^1$ of the rod $d$ works loosely in the disk $c$ so that it can be turned to lock by a pin $d^2$ in a bayonet catch $f$ in the boss $e^1$ of the plate $e$. In the normal state the device is in position as shown in Fig. 1, with the prongs withdrawn and the rod $d$ with the disk in a raised position. Now, after the hat is placed on the head the rod or plunger $d$ is pressed down by the knob $d^3$, thereby forcing down the disk and extending the prongs $a$ so as to catch in the hair of the wearer, as shown in Figs. 2 and 3, and the device is then locked in the extended position by turning the rod $d$ so that the pin $d^2$ locks in the catch $f$. To release the device the pin $d^2$ is disengaged and the rod $d$ raised, thereby withdrawing the prongs $a$ from the hair of the wearer, and the hat can then be removed.

Instead of the pin $d^2$ and joint $e^3$, a catch such as shown in Fig. 10 can be used to lock the device; in this case a wire $d^2$ is hinged to the plate $e$, and pressing over the knob $d^3$ engages with the jaw-catch $f$ as shown.

The disk $c$ may be formed as shown in Figs. 6, 7, 8 and 9, and the prongs $a$ may be spikes as shown in Fig. 6, hair-pins as shown in Fig. 8, or wires as shown in Fig. 9.

The rod $d$ may be adapted to operate as a simple plunger as shown in Fig. 1, or the rod $d$ may be screwed and adapted to work in a female screw formed in the plate $e$, as shown in Fig. 11.

The disk $c$ and the plate $g$ may be attached to a spiral spring $b^4$ and the upper end of the rod $d$ adapted to screw into the boss $e^1$ to lock the device when in extension, as shown in Fig. 12, the spring $b^4$ withdrawing the device when released. As an alternative to the spring arrangement shown in Fig. 12, a spiral spring $b^4$ may be placed under the disk $c$ and adapted to bear against a wire or the like $b^5$ fitted to the bell-mouth as shown in Fig. 13.

Fig. 14 shows a means for attaching the bell-mouth $b$ to the inside of a hat; in this stays $b^6$ are provided, one end of each stay being attached to the bell-mouth $b$, and the other end being adapted to screw into screw-threaded collars $b^7$ attached to the shell of the hat, as shown in Fig. 14.

Fig. 15 shows in side elevation, partly in section, and Fig. 16 in plan view, an arrangement for suspending and holding the bell-mouth $b$ by guide spindles $b^8$ from a plate $g$ fitted inside the hat, in this case the disk $c$ is provided with guide holes $c^2$ through which the spindles $b^8$ pass. The holes $c^2$ are a sliding fit on the spindles $b^8$. The end of the spindle $d$ is made to project through the disk $c$ and is screw-threaded to screw into a screwed boss $e^2$, formed on the top plate of the bell-mouth $b$, to hold the disk $c$ and prongs $a$ when extended. In action the disk $c$ works up and down on the spindles $b^8$ when operated by the spindle $d$.

The bell-mouth $b$ in all the examples may be supported by wires or the like $b^6$ fixed to the side of the hat as shown in Fig. 17.

The bell-mouth $b$ is covered and padded with a suitable textile material $b^2$ through which the prongs $a$ pass, and by which such prongs $a$ are guided as they are extended through the slots or holes in the bell-mouth $b$; the padding also serves to enable the device to rest comfortably on the head of the wearer.

In operation, after the hat has been placed on the head of the wearer, by pressing on the knob $d^3$, the rod $d$ is forced down with the disk $c$, and the prongs $a$ are caused to extend radially through the slots in the bell-mouth $b$ and enter the hair of the wearer, the device being then locked by a turn of the knob $d^3$, or otherwise. To release the device the knob $d^3$ is unlocked and raised, thereby withdrawing the prongs from the hair of the wearer. The alternative action to the beforegoing is by screwing down the rod $d$ or the disk $c$, as the case may be, as hereinbefore described.

The hat-securing device above described, can be made with the bell-mouth round, square, or other suitable shape, and it may be of metal, celluloid, or other suitable material. The head or knob of the device may be of any suitable size and shape, and of any valuable or suitable material, and ornamented with jewels or otherwise.

Having thus described my invention, what I claim as new therein, and desire to secure by Letters Patent is:—

A device for holding head-coverings, comprising, in combination, a plate adapted for connection to the head-covering and provided with a central opening; a tubular element connected to said plate and arranged concentrically thereof, one wall of said element being provided with a series of spaced guide slots; an operating rod movable endwise through said opening and having its respective outer and inner end portions disposed exteriorly and interiorly of said element; a head secured to the outer end of said rod for actuating the same; a disk secured to the inner end of said rod; and a series of radially-disposed hair-engaging members pivoted at their inner ends to said disk and having their end portions projecting outwardly through said slots, whereby said members will be advanced radially in unison into operative position when said rod is moved inwardly through said opening and retracted radially into inoperative position when said rod is moved outwardly through said opening.

In testimony whereof I have hereunto set my hand in presence of two subscribing witnesses.

ARTHUR THOMAS GARDNER.

Witnesses:
ALFRED CHARLES GARDNER,
JOHN REES WILLIAMS.

Copies of this patent may be obtained for five cents each, by addressing the "Commissioner of Patents, Washington, D. C."